United States Patent
Kim et al.

(10) Patent No.: US 8,115,884 B2
(45) Date of Patent: Feb. 14, 2012

(54) LIQUID CRYSTAL DISPLAY DEVICE AND METHOD FOR FABRICATING THE SAME

(75) Inventors: Binn Kim, Seoul (KR); Hyung Nyuck Cho, Incheon-si (KR); Nam Wook Cho, Gunpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/165,112

(22) Filed: Jun. 21, 2011

(65) Prior Publication Data

US 2011/0249218 A1      Oct. 13, 2011

Related U.S. Application Data

(62) Division of application No. 11/639,921, filed on Dec. 15, 2006, now Pat. No. 7,969,521.

(30) Foreign Application Priority Data

Jun. 19, 2006 (KR) .................. 10-2006-0054807

(51) Int. Cl.
*G02F 1/136* (2006.01)

(52) U.S. Cl. ........................................ 349/44

(58) Field of Classification Search .......... None
See application file for complete search history.

(56) References Cited

U.S. PATENT DOCUMENTS

| | | | |
|---|---|---|---|
| 6,611,309 B2* | 8/2003 | Park et al. | 349/141 |
| 6,806,937 B2* | 10/2004 | Park et al. | 349/149 |
| 7,969,521 B2* | 6/2011 | Kim et al. | 349/44 |
| 2004/0169812 A1 | 9/2004 | Kim | |
| 2006/0145155 A1 | 7/2006 | Choi et al. | |

FOREIGN PATENT DOCUMENTS

CN      1508612      6/2004

OTHER PUBLICATIONS

Office Action issued in corresponding Chinese Patent Application No. 2006101682041; issued Aug. 29, 2008.

* cited by examiner

*Primary Examiner* — Timothy L Rude

(74) *Attorney, Agent, or Firm* — Brinks Hofer Gilson & Lione

(57) ABSTRACT

A liquid crystal display (LCD) device partially or substantially blocks light from a light source from exciting a semiconductor layer. The LCD device includes a substrate, a semiconductor layer, a light-shielding layer, and a light source. The light source directs light toward a lower surface of the substrate. The light-shielding layer is formed between the substrate and the semiconductor layer. Some or all of the light directed towards the semiconductor layer by the light source is blocked by the light-shielding layer.

16 Claims, 9 Drawing Sheets backlight driving frequency backlight driving frequency

ON  OFF  ON  OFF backlight turn-on/off frequency

LIQUID CRYSTAL DISPLAY DEVICE AND METHOD FOR FABRICATING THE SAME

The present patent document is a divisional of U.S. patent application Ser. No. 11/639,921, filed Dec. 15, 2006, which claims priority to Korean Patent Application No. 10-2006-054807 filed in Korea on Jun. 19, 2006, which is hereby incorporated by reference.

BACKGROUND

1. Field of the Invention

The present invention relates to a liquid crystal display (LCD) device, and more particularly, to a LCD device that substantially prevents a semiconductor layer from being excited.

2. Discussion of the Related Art

Generally, a LCD device displays images by controlling a light transmittance of liquid crystal with an electric field. For this, the LCD device includes a LCD panel which includes liquid crystal cells arranged in a matrix configuration, a driving circuit which drives the LCD panel, and a backlight unit which emits a light to the LCD panel.

The LCD panel also includes a thin film transistor array substrate, a color filter array substrate, a spacer, and a liquid crystal layer. The thin film transistor array substrate may be positioned opposite the color filter array substrate. The spacer maintains a predetermined cell gap between the two substrates. The liquid crystal layer is formed in the cell gap provided between the two substrates.

The thin film transistor array substrate includes multiple gate lines, multiple data lines, a thin film transistor, a pixel electrode, and an alignment layer. Each gate line is formed perpendicular to each data line to define a unit pixel. The thin film transistor is formed adjacent to a crossing portion of the gate and data lines. The pixel electrode is formed near each liquid crystal cell and is connected to the thin film transistor. The alignment layer is applied over the pixel electrode and the thin film transistor. The gate and data lines receive signals from driving circuits. The thin film transistor supplies a pixel voltage signal transmitted through a data line to the pixel electrode in response to a scan signal transmitted through a gate line.

The color filter array substrate includes multiple color filters, a black matrix, and a common electrode. The multiple color filters are provided to the respective liquid crystal cells. The black matrix divides the color filters, and may substantially prevent light from leaking between the filters. The common electrode may supply a reference voltage to the liquid crystal cells. An alignment layer may be applied to the color filter array substrate.

After separately forming the thin film transistor array substrate and the color filter array substrate, the two substrates may be bonded to each other. Liquid crystal may then be injected into the cell gap between the two substrates.

The thin film transistor array substrate of the LCD panel is fabricated by multiple mask and semiconductor steps. The fabrication of the LCD panel can be a complicated and complex process and may include high fabrication costs. Each mask step can include deposition of a material, cleaning, photolithography, etching, photoresist stripping, and inspection. To form the thin film transistor array substrate, five masks are generally used. Reduction of the number of masks used can reduce the complexity and cost of the fabrication process. The fabrications of some LCD devices use four masks to form the thin film transistor array substrate. In these fabrications, one mask step can be eliminated by forming a semiconductor layer and a data line are formed at the same time.

FIG. 1A is a diagram of a backlight driving signal driven in a continuous mode. FIG. 1B is a diagram of a backlight driving signal driven in a burst mode. As shown in FIG. 1A, the backlight unit is continuously maintained in the turned-on state. Driving the backlight unit in this manner can increase power consumption of the LCD device. In order to decrease the power consumption, the backlight unit may be driven in the burst mode.

For the burst mode, as shown in FIG. 1B, the backlight unit is turned-on for a portion of time and turned-off for a portion of time. This turned-on and turned-off cycle may be repeated for a preset period of time. When the backlight unit is turned-on in the burst mode, a photocurrent can excite a semiconductor layer in a portion of a LCD panel's data line making the semiconductor layer act as a conductor. During the time period when the backlight unit is turned-off, this semiconductor layer is no longer excited and does not act as a conductor.

When the semiconductor layer becomes conductive, a capacitance occurs between the semiconductor layer and the pixel electrode. However, when the semiconductor layer is the nonconductive, a capacitance occurs between the data line and the pixel electrode. Depending upon the state of the backlight unit driven in the burst mode, different capacitances may be generated. The different capacitances generated between the semiconductor layer and the pixel electrode or between the data line and the pixel electrode can cause noise in the LCD device. This noise can adversely affect the picture quality of the LCD device. Therefore, a need exists for an improved LCD device.

BRIEF SUMMARY

A liquid crystal display (LCD) device partially or substantially blocks light from a light source from exciting a semiconductor layer. The LCD device includes a substrate, a semiconductor layer, a light-shielding layer, and a light source. The light source directs light toward a lower surface of the substrate. The light-shielding layer is formed between the substrate and the semiconductor layer. Some or all of the light directed towards the semiconductor layer by the light source is blocked by the light-shielding layer.

Other apparatuses, methods, features and advantages will be or will become apparent to one with skill in the art upon examination of the following figures and detailed description. It is intended that all such additional apparatuses, methods, features and advantages be included within this description, be within the scope of the invention, and be protected by the following claims.

BRIEF DESCRIPTION OF THE DRAWINGS

The discussion below may be better understood with reference to the following drawings and description. The components in the figures are not necessarily to scale, emphasis instead being placed upon illustrating the principles of the invention. Moreover, in the figures, like referenced numerals designate corresponding parts through the different views.

DETAILED DESCRIPTION OF THE DRAWINGS AND THE PRESENTLY PREFERRED EMBODIMENTS

Figure 1A:
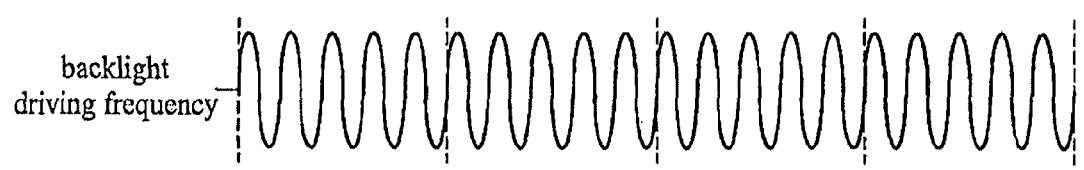
FIG. 1A is a diagram of a backlight driving signal driven in a continuous mode.
Figure 1B:
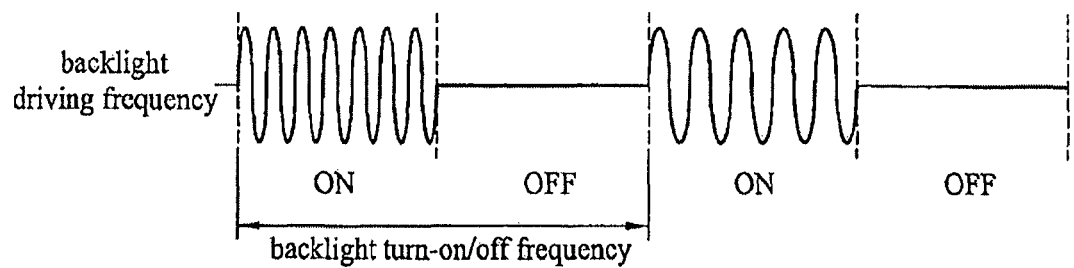
FIG. 1B is a diagram of a backlight driving signal driven in a burst mode.
Figure 2:
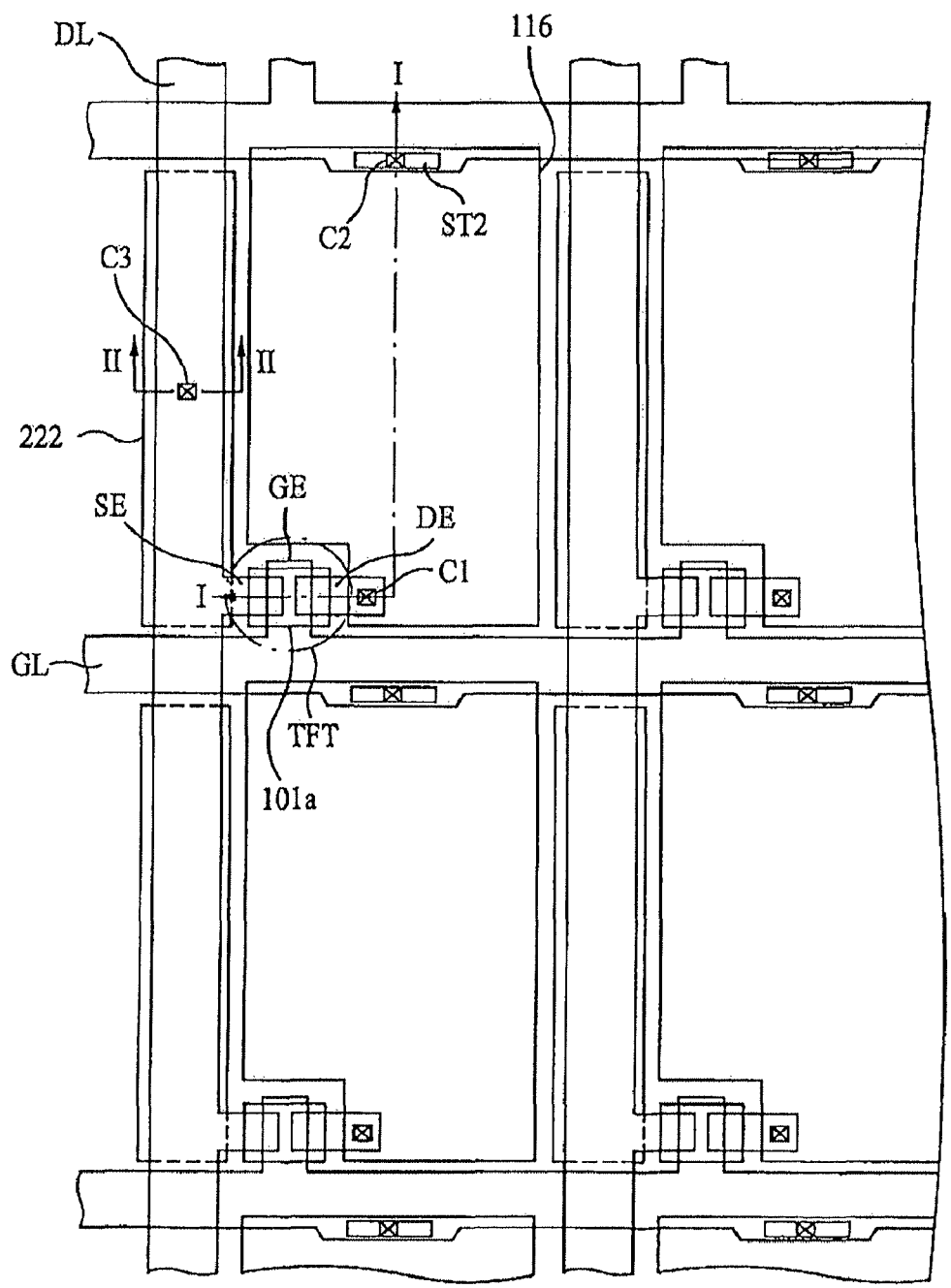
FIG. 2 is a plan view of a thin film transistor array substrate of a LCD.
Figure 3:
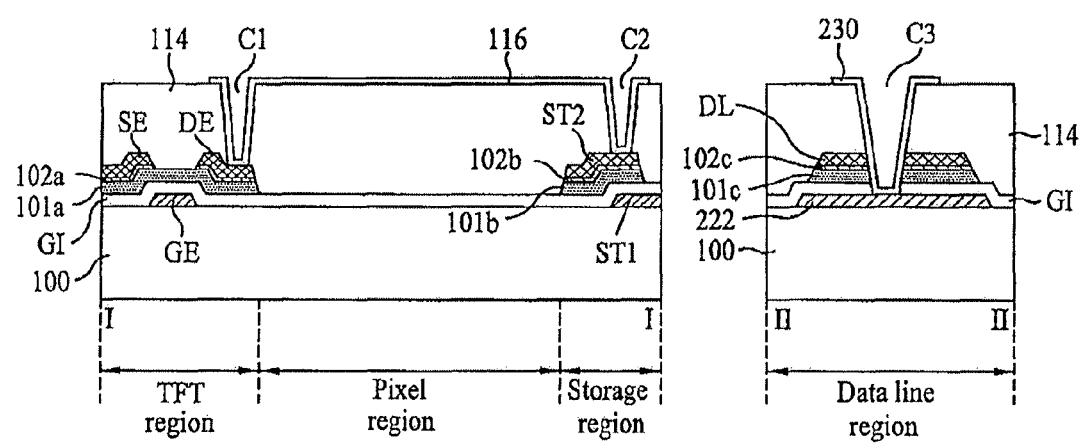
FIG. 3 is a cross section view along I-I and II-II of FIG. 2.

FIG. 2 is a plan view of a thin film transistor array substrate of a LCD. FIG. 3 is a cross section view along I-I and II-II of FIG. 2. As shown in FIGS. 2 and 3, the LCD device includes a substrate 100 provided with multiple pixel regions defined by multiple gate and data lines (GL, DL), a thin film transistor (TFT) formed adjacent to each crossing of the gate and data lines, a pixel electrode 116 formed in each of the pixel regions, and at least one light-shielding layer 222 overlapped by a third semiconductor layer 101c positioned below the data line (DL). The light-shielding layers may be electrically connected to a data line (DL).

As shown in FIG. 3, the TFT is formed in a TFT region. The TFT may comprise a first semiconductor layer 101a, a first ohmic contact layer 102a, a gate electrode (GE), a source electrode (SE), and a drain electrode (DE). The source electrode (SE) of the TFT may be formed as one body with the data line (DL) formed in a data line region. The first semiconductor layer 101a may be formed in the TFT region, and may be formed as one body with the third semiconductor layer 101c which can be formed in the data line region. The first ohmic contact layer 102a may be formed below the source electrode (SE) of the TFT region, and may be formed as one body with the third ohmic contact layer 102c which can be formed in the data line region.

As shown in FIG. 2, a pixel electrode 116 may be partially overlapped with the gate line (GL) of an adjacent pixel region. A storage capacitor may be formed in the overlapped portion between the pixel electrode 116 and the gate line (GL).

A portion of the gate line (GL) can function as a first storage electrode (ST1) of the storage capacitor. A metal layer provided below the pixel electrode 116, and electrically connected to the pixel electrode 116, can function as a second storage electrode (ST2) of the storage capacitor.

One portion of the pixel electrode 116 can be electrically connected to the drain electrode (DE) through a first contact hole (C1) which exposes a portion of the drain electrode (DE). Additionally, a portion of the pixel electrode 116 can be electrically connected to the second storage electrode (ST2) through a second contact hole (C2) which exposes a portion of the second storage electrode (ST2).

A second semiconductor layer 101b, a second ohmic contact layer 102b, and a gate insulating layer (GI) may be formed between the first storage electrode (ST1) and the second storage electrode (ST2). The second semiconductor layer 101b may be separated from the first and third semiconductor layers 101a and 101c. The second ohmic contact layer 102b may be separated from the first and third ohmic contact layers 102a and 102c.

A light-shielding layer 222 may be formed below the third semiconductor layer 101c and the gate insulating layer (GI) positioned in the data line region. The light-shielding layer 222 may substantially block some or all of the light emitted from a backlight unit from being incident on the third semiconductor layer 101c. The light-shielding layer 222 may be identical in size to the third semiconductor layer 101c, may be larger than the third semiconductor layer 101c, or may be smaller than the third semiconductor layer 101c.

To prevent the light-shielding layer from floating, and to prevent the capacitance from occurring between the light-shielding layer 222 and the data line (DL), the light-shielding layer 222 may be electrically connected to the data line (DL). That is, the light-shielding layer 222 may be electrically connected to the data line (DL) through a third contact hole which exposes a portion of the data line (DL). Alternatively, the light-shielding layer 222 may be electrically connected to the data line (DL) through the use of a connection layer. The connection layer may be formed from the same material as the pixel electrode. The connection layer can comprise Indium Tin Oxide (ITO). When the light-shielding layer 222 is electrically connected to the data line (DL), the same data signal is supplied to the light-shielding layer 222 and the data line (DL).

The light-shielding layer 222 may be formed of the same material as the gate line (GL). The light-shielding layer 222 may be formed along the third semiconductor layer 101c. To prevent a short between the light-shielding layer 222 and a gate line (GL), the light-shielding layer 222 may not be formed in the crossing portion of the gate and data lines (GL, DL).

Figure 4A:
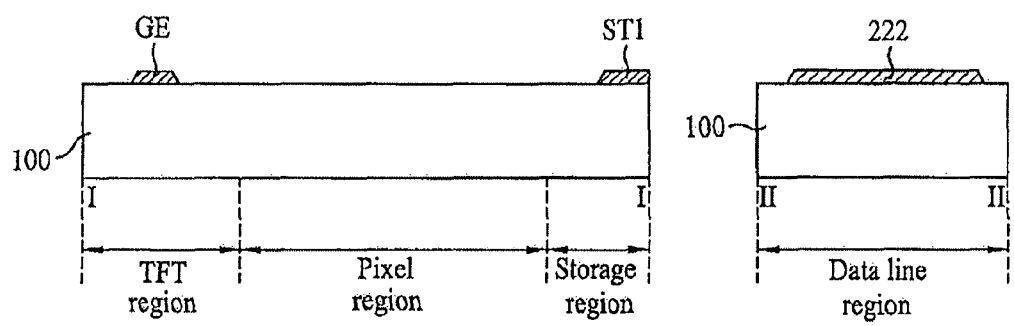
FIGS. 4A to 4G are cross section views of illustrating a method for fabricating a LCD device according to the preferred embodiment of the present invention.

FIGS. 4A to 4G are cross section views illustrating a fabrication method for the LCD device of FIG. 3. The substrate 100 comprises a TFT region, a pixel region, a storage region, and a data line region. As shown in FIG. 4A, a gate electrode (GE), a first storage electrode (ST1), and a light-shielding layer 222 are formed on the surface of the substrate 100. The gate electrode (GE), the first storage electrode (ST1), and the light-shielding layer 222 may be formed on the substrate 100 by depositing a metal layer on the substrate 100 and using a photolithography process to remove portions of the metal layer. The gate electrode (GE) may be formed as one body with a gate line. Additionally, the gate electrode (GE) may be formed on the TFT region of the substrate 100. The first storage electrode (ST1) may be formed on the storage region of substrate 100, and may correspond to a portion of the gate line (GL) provided in the pixel region of an adjacent pixel electrode. The light-shielding layer 222 may be formed on the data line region of the substrate 100.

Figure 4B:
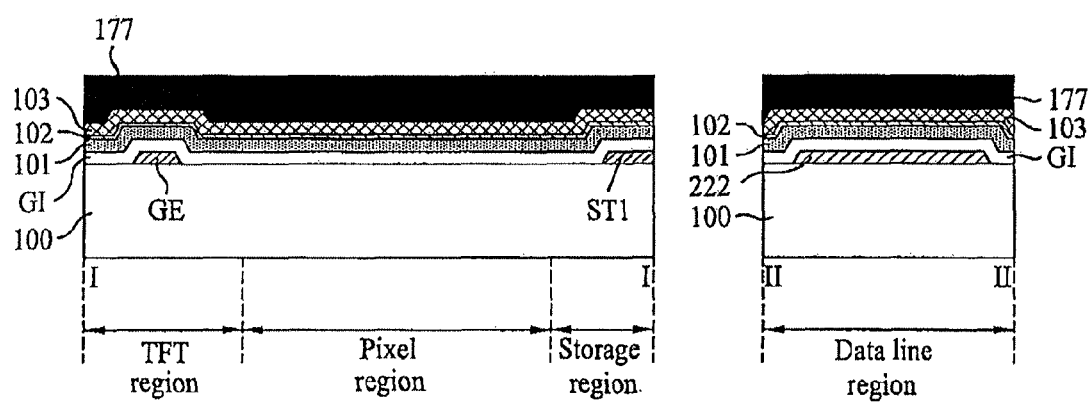

As shown in FIG. 4B, a gate insulation layer (GI), a semiconductor material layer 101, an impurity semiconductor material layer 102, a metal layer 103 and a photoresist layer 177 are sequentially deposited on the surface of the substrate 100 including the gate electrode (GE), the first storage electrode (ST1), and the light-shielding layer 222. The gate insulation layer (GI) may be formed from an insulating material, such as silicon oxide (SiOx) or silicon nitride (SiNx). The semiconductor material layer 101 may be formed from intrinsic amorphous silicon. The impurity semiconductor material layer 102 may be formed from amorphous silicon doped with impurity ions. The metal layer 103 may be formed from a conductive material, such as chrome (Cr) or molybdenum (Mo).

Figure 4C:
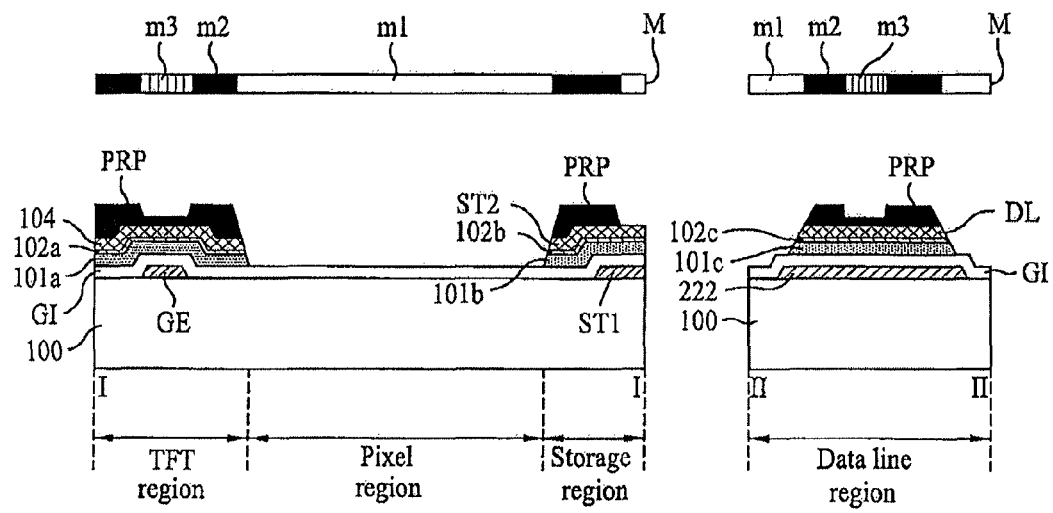

In FIG. 4C, a photoresist pattern (PRP) may be formed by selectively exposing the photoresist layer 177 to ultraviolet (UV) rays through the use of a diffraction exposure mask (M). The diffraction exposure mask (M) may include open parts (m1) which transmit the UV rays; closed parts (m2) which substantially block the UV rays; and a diffraction parts (m3) which include slits to partially transmit portions of the UV rays. In FIG. 4C, diffraction parts (m3) are positioned over the TFT and the data line regions In the regions were the open parts (m1) of the diffraction mask are located, the photoresist layer 177 can be removed by the application of the UV rays. In FIG. 4C, the photoresist layer 177 has been removed from the pixel region. Additionally, the photoresist layer 177 corresponding to the closed parts (m2) has remained substantially unchanged, and the photoresist layer 177 corresponding to the diffraction parts (m3) has been partially removed by a predetermined thickness. The predetermined thickness corresponding to the diffraction part (m3) may be half of the original thickness of photoresist layer 177.

FIG. 4C also shows that portions of the metal layer 103, the semiconductor material layer 101, and the impurity semiconductor material layer 102 have been removed. The removed portions of these layers may be removed by a wet-etching process that can use the patterned photoresist pattern (PRP) as a mask. As shown in FIG. 4C, the first semiconductor layer 101a, the first ohmic contact layer 102a and the source/drain metal layer 104 are sequentially formed on the gate insulation layer (GI) above the gate electrode (GE). The second semiconductor layer 101b, the second ohmic contact layer 102b, and the second storage electrode (ST2) are formed on the gate insulation layer (GI) above the first storage electrode (ST1), there are. Additionally, the third semiconductor layer 101c, the third ohmic contact layer 102c, and the data line (DL) are formed on the gate insulation layer (GI) above the light-shielding layer 222.

Figure 4D:
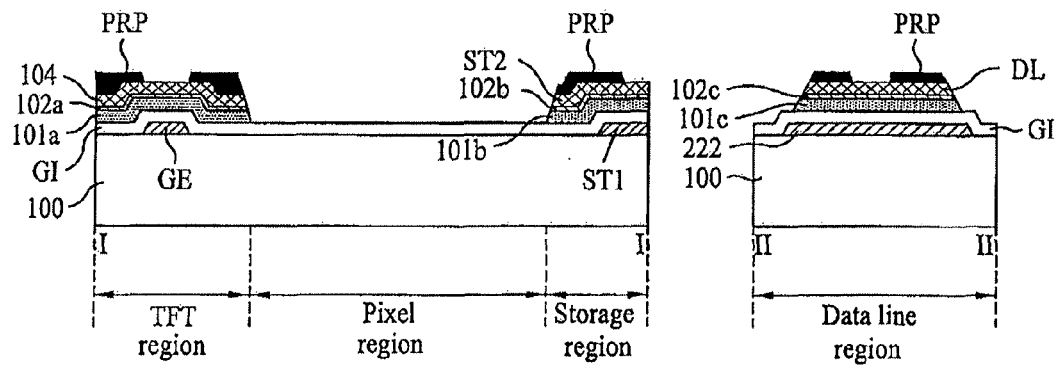

The photoresist pattern (PRP) can be treated with plasma, to ash the photoresist pattern (PRP). The ashing process can be used to remove portions of the photoresist pattern (PRP). In FIG. 4C, the photoresist pattern (PRP) corresponding to the diffraction part (m3) is thinner then the portions corresponding to the closed part (m2). After the ashing process, the photoresist pattern (PRP) corresponding to the diffraction part (m3) has been removed, as shown in FIG. 4D, and portions of the source/drain metal layer 104 and the data line (DL) have been exposed. Additionally, the ashing process has reduced the thickness of the photoresist pattern (PRP) corresponding to the closed part (m2).

The exposed portions of the source/drain metal layer 104, first ohmic contact layer 102a, data line (DL), and third ohmic contact layer 102c may be removed. The exposed portions of these layers may be removed through an etching process that uses the remaining photoresist pattern (PRP) as a mask. Additionally, the remaining photoresist pattern (PRP) may be removed.

Figure 4E:
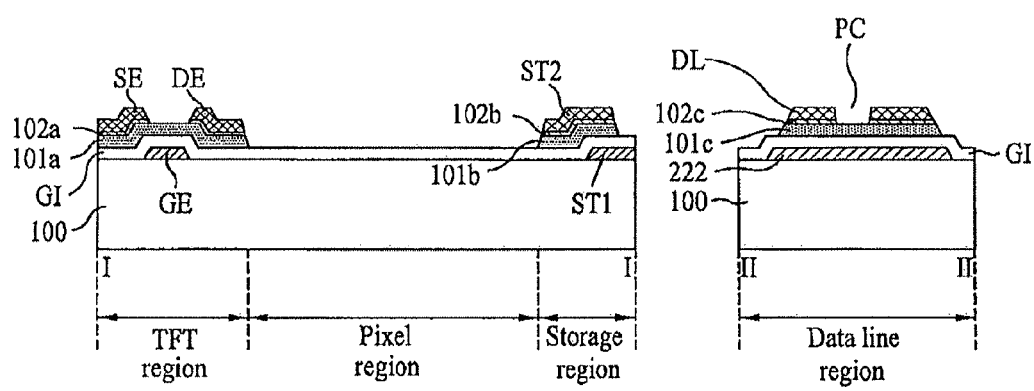

As a result, in FIG. 4E, the source and drain electrodes (SE, DE) may be formed by separating the source/drain metal layer 104. A channel is formed in the TFT region where the source/drain metal layer 104 was separated and a portion of the first semiconductor layer 101a is exposed. As shown in FIG. 4E, the source and drain electrodes (SE, DE) can overlap the edges of the first semiconductor layer 101a. Additionally, FIG. 4E shows, a preliminary contact hole (PC) that is formed in the data line region and which exposes a portion of the third semiconductor layer 101c.

Figure 4F:
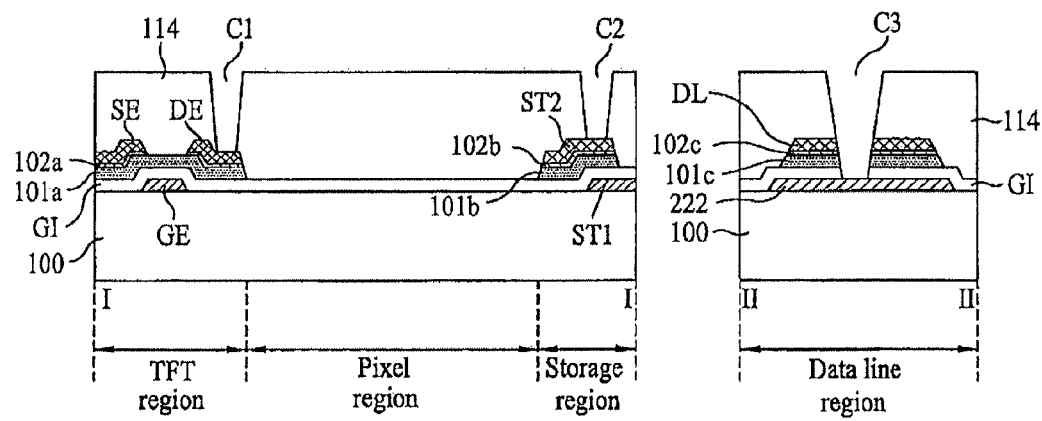

In FIG. 4F, a passivation layer 114 may be formed by depositing an organic insulation material on the substrate 100 which can include the source electrode (SE), the drain electrode (DE), the gate insulation layer (GI), the data line (DL), and the second storage electrode (ST2). Portions of the passivation layer 114 may be removed to form a first contact hole (C1), a second contact hole (C2), and a third contact hole (C3). The portion of the passivation layer 114 removed to form the first contact hole (C1) may be within the TFT region and may overlie the drain electrode (DE). The portion of the passivation layer 114 removed to form the second contact hole (C2) may be within the storage region and may overlie the second storage electrode (ST2). The portion of the passivation layer 114 removed to form the third contact hole (C3) may be within the data line region and may overlie the light-shielding layer 222. Additionally, portions of the third ohmic contact layer 102c, the third semiconductor layer 101c, and the gate insulation layer (GI) may be removed during the formation of the third contact hole (C3).

As an alternative to using the organic insulation material, the passivation layer 114 may be formed of an inorganic insulation material. The inorganic insulation material used for the passivation layer 114 may comprise silicon oxide (SiOx) or silicon nitride (SiNx).

Figure 4G:
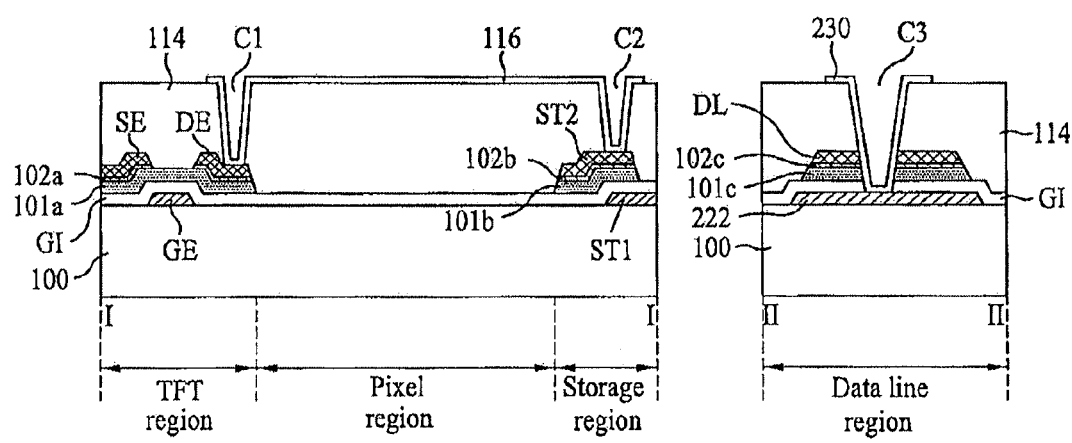

A conductive layer may be deposited on the surface of the passivation layer 114 and then patterned by photolithography to form the pixel electrode 116 in the pixel region, as shown in FIG. 4G. The conductive layer used to form the pixel electrode 116 may comprise a transparent material. A portion of the pixel electrode 116 may be electrically connected to the drain electrode (DE) through the first contact hole (C1), and another portion of the pixel electrode 116 may be electrically connected to the second storage electrode (ST2) through the second contact hole (C2).

A connection layer 230 may be formed in the data region. Through the use of the third contact hole (C3), the connection layer 230 may electrically connect the data line (DL) and the light-shielding layer 222 with each other. The connection layer 230 may be electrically connected to an inner sidewall of the contact hole (inner sidewall formed of the data line DL) which passes through the third semiconductor layer 101c. Although shown in one location in FIGS. 2, 3, and 4, the position of the third contact hole may vary.

Figure 5A:
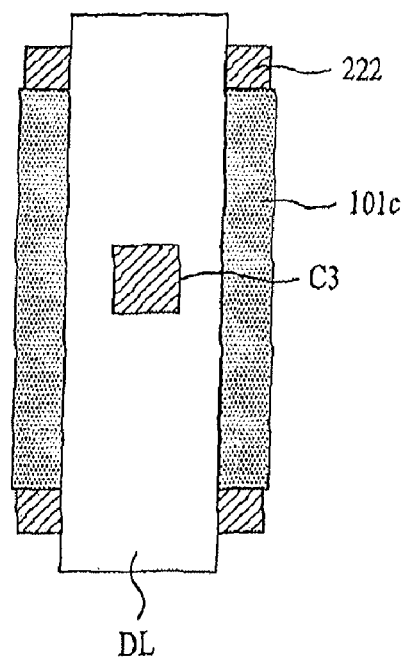
FIGS. 5A to 5D are plan views of illustrating a position of a third contact hole.
Figure 5B:
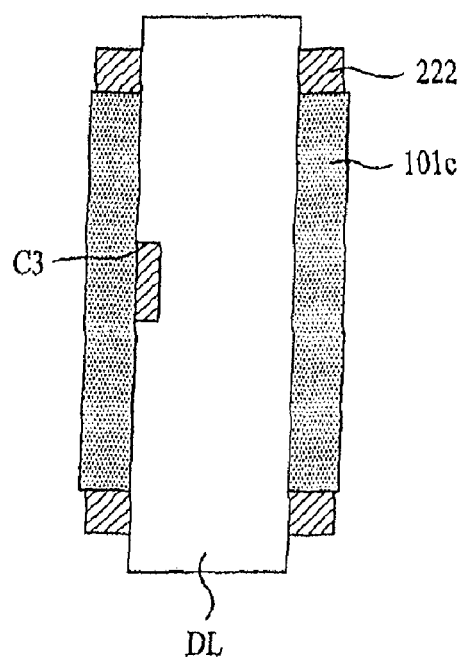
Figure 5C:
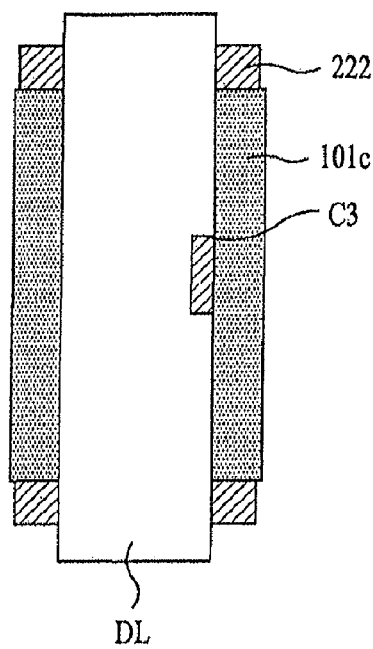

FIGS. 5A to 5D are plan views illustrating varying positions of the third contact hole. In FIG. 5A, the third contact hole (C3) may pass through the center of the data line (DL). In FIG. 5B, the third contact hole (C3) may pass through the left-sided edge of the data line (DL). In FIG. 5C, the third contact hole (C3) may pass through the right-sided edge of the data line (DL). In FIGS. 5B and 5C, one side of the third contact hole (C3) is open.

Figure 5D:
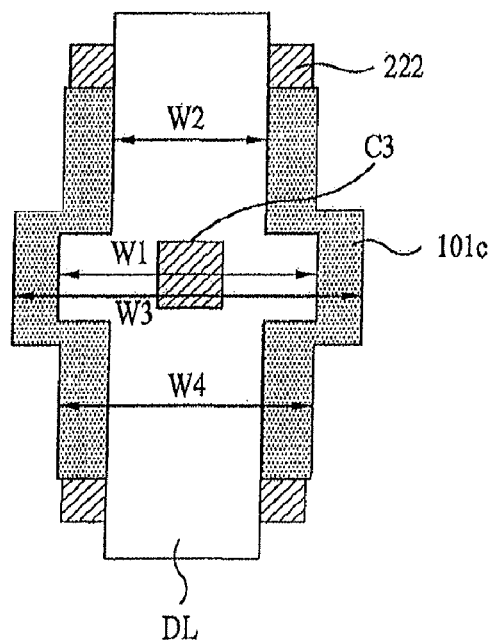

In FIG. 5D, the third contact hole (C3) is positioned in the center of the data line (DL) and portions of the data line (DL) surrounding the third contact hole (C3) may be different in size from the other portions of the data line (DL). In FIG. 5D, the data line (DL) includes a first portion and a second portion. A first width (W1) of the first portion may be different from a second width (W2) of the second portion. The first portion of the data line (DL) has the third contact hole (C3). The second portion of the data line (DL) has no third contact hole (C3). In FIG. 5D, the first width (W1) is larger than the second width (W2). Alternatively, the locations of the first and second widths (W1 and W2) could be reversed and/or the first width (W1) could be less than the second width (W2).

Also, the semiconductor layer 101c includes a first portion and a second portion. A third width (W3) of the first portion may be different from a fourth width (W4) of the second portion. In FIG. 5D, the first portion of the semiconductor layer 101c has the third contact hole (C3), and the second portion of the semiconductor layer 101c has no third contact hole (C3). In FIG. 5D, the third width (W3) is larger than the fourth width (W4). Alternatively, the locations of the third and fourth widths (W3 and W4) could be reversed and/or the third width (W3) could be less than the fourth width (W4).

Although not shown, the third ohmic contact layer 102c may include a first portion and a second portion. A fifth width (W5) of the first portion may be different from a sixth width (W6) of the second portion. The first portion of the third ohmic contact layer 102c has the third contact hole (C3), and the second portion of the third ohmic contact layer 102c has no third contact hole (C3). The fifth width (W5) may be larger than the sixth width (W6). Alternatively, the locations of the fifth and sixth widths (W5 and W6) could be reversed and/or the fifth width (W5) could be less than the sixth width (W6).

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A LCD device comprising:
 a substrate provided with a pixel region defined by a gate line and a data line, the gate line and the data line arranged perpendicular to one another;
 a thin film transistor formed adjacent to a crossing of the gate and data lines;
 a pixel electrode formed in the pixel region; a semiconductor layer formed between the substrate and the data line; a light source to emit light towards a lower surface of the substrate; a light-shielding layer formed between the light source and the semiconductor layer, the light-shielding layer electrically connected to the data line; and
 a contact hole which exposes the light-shielding layer by sequentially passing through predetermined portions of the passivation layer, the data line, the semiconductor layer, and the insulation layer; and
 a connection layer which electrically connects the light-shielding layer with the data line through the contact hole.

2. The LCD device of claim 1, wherein the light-shielding layer substantially blocks the light emitted from the light source from being incident on the semiconductor layer.

3. The LCD device of claim 2, wherein the light-shielding layer partially covers the semiconductor layer.

4. The LCD device of claim 2, wherein the light-shielding layer completely covers the semiconductor layer.

5. The LCD device of claim 1, wherein the light-shielding layer is formed between the substrate and the semiconductor layer.

6. The LCD device of claim 5, further comprising:
 an insulation layer formed between the light-shielding layer and the semiconductor layer; and
 a passivation layer formed between the pixel electrode and the data line.

7. The LCD device of claim 1, wherein the contact hole passes through the center of the data line.

8. The LCD device of claim 1, wherein the contact hole passes through one edge of the data line.

9. The LCD device of claim 8, wherein one inner sidewall of the contact hole is open.

10. The LCD device of claim 1, wherein the data line includes a first portion having the contact hole and a second portion having no contact hole, and a first width of the first portion is different from a second width of the second portion.

11. The LCD device of claim 10, wherein the first width is larger than the second width.

12. The LCD device of claim 1, wherein the semiconductor layer includes a first portion having the contact hole and a second portion having no contact hole, and a first width of the first portion is different from a second width of the second portion.

13. The LCD device of claim 12, wherein the first width is larger than the second width.

14. The LCD device of claim 1, wherein the connection layer comprises the same material as the pixel electrode.

15. The LCD device of claim 1, wherein the light-shielding layer comprises a conductive metal material.

16. The LCD device of claim 1, wherein the light-shielding layer comprises the same material as the gate line.

* * * * *